United States Patent [19]
Kesinger et al.

[11] 3,906,875
[45] Sept. 23, 1975

[54] TRANSPLANT HANDLING MEANS

[75] Inventors: Donald A. Kesinger, Denver; Leland S. Inscho, Jr., Evergreen, both of Colo.

[73] Assignee: The Gates Rubber Company, Denver, Colo.

[22] Filed: July 10, 1974

[21] Appl. No.: 485,393

Related U.S. Application Data

[60] Division of Ser. No. 318,952, Dec. 27, 1972, which is a continuation-in-part of Ser. No. 102,582, Dec. 30, 1970, Pat. No. 3,772,137.

[52] U.S. Cl. ................................. 111/2; 47/37 X
[51] Int. Cl.² .................................. A01C 11/02
[58] Field of Search ............ 47/34, 34.13, 37, 1.2, 47/56; 111/1–3

[56] References Cited
UNITED STATES PATENTS

| | | | |
|---|---|---|---|
| 3,164,507 | 1/1965 | Masuda | 47/37 X |
| 3,172,234 | 3/1965 | Eavis | 47/34.13 |
| 3,362,106 | 1/1968 | Goldring | 47/56 |
| 3,515,036 | 6/1970 | Oki et al. | 47/37 X |
| 3,524,419 | 8/1970 | Middleton et al. | 47/37 X |
| 3,757,468 | 9/1973 | Shirouzu | 47/34.13 |

*Primary Examiner*—Robert E. Bagwill
*Attorney, Agent, or Firm*—Curtis H. Castleman, Jr.; Raymond Fink; H. W. Oberg, Jr.

[57] ABSTRACT

Process and transplanting apparatus are described for handling and treating a plurality of seeds including the method of (1) forming a continuous transplant carrier provided with spaced connected containers, each of sufficient size to accommodate a germinated seed or plant, and media to support growth and provided with means for the exchange of moisture and gases, (2) inserting seed and support media within the containers, (3) germinating and preculturing the seeds in the containers for at least a period of time to allow radical and cotyledon to emerge from the seed coats and develop, and (4) mechanically severing and transplanting individual containers with included transplants. The invention is particularly useful in the automated transplanting of a variety of plants including tree seedlings and high value crops such as sugar beets and lettuce.

7 Claims, 8 Drawing Figures

TRANSPLANT HANDLING MEANS

BACKGROUND OF THE INVENTION

This application is a division of application Ser. No. 318,952, filed Dec. 27, 1972, which in turn is a continuation-in-part of commonly assigned copending application United States Ser. No. 102,582 filed Dec. 30, 1970, now U.S. Pat. No. 3,772,137.

This invention relates to a transplant handling means in which seedlings supported along a continuous transplant tape are precultured and then mechanically planted in uniform spaced relationship.

It has been the common practice in automated seed tape planting to plant individual seeds at approximately equally spaced intervals by spacing individual seeds along the length of two rolls of paper to form a seed tape, and then tearing off and planting at the proper location segments of the tape containing a single seed. The process described in U.S. Pat. No. 3,294,045 (Kelley) proceeds a step further beyond conventional methods by treating the seed tape to pregerminate all of the seeds contained in the tape prior to placement into the ground. In Kelley, pregermination is defined to mean that the seed tape is placed in a controlled environment for a period of time necessary to bring the seeds to the point where the roots are just ready to emerge from the seed coat.

While continuous seed tape planting methods have shown advantages over traditional random planting of seeds, the methods suffer from a number of drawbacks which are overcome by the present invention. One such drawback is that seeds, as compared with seedlings, are more susceptible to certain adverse environmental conditions within the field. For instance, seeds are generally more affected than transplants by insects such as root maggot and various weeds. At the same time bare seeds are more sensitive to herbicides and insecticides than seedlings or transplants. Thus in the case of seedlings or transplants, it is possible at the time of planting to use increased strength post emergence herbicides rather than conventional pre-emergence herbicides. Another advantage of using seedlings which are already well established is that the crops will mature earlier for harvest and may grow over a longer period of time, thereby producing a larger crop that is more highly developed, e.g. in the case of sugar beets producing a larger crop with higher sugar content per sugar beet harvested.

A further advantage of employing transplants over seeds is that the preculturing period of the transplant provides a head start which will particularly be advantageous in relatively cold climates such as found in Minnesota and Colorado, where the growing season is oftentimes too short for a variety of crops. Other advantages of the invention include a process by which substantial uniform emergence of all seedlings is obtained so that a one-pass harvest is all that is necessary; the need for hand or mechanical thinning is minimized; and such common emergence problems as soil crusting, salt accumulation, high temperature impeding germination, poor aeration and damp-off are obviated.

Prior art transplanters have generally been of one of two types: manual setting or mechanical. In the former type operators or "setters" manually set the transplants in furrows. The mechanical type employs plant setters who place the plants in transplanting pockets or grippers which firmly hold them and revolve on a chain until they are automatically released in opened furrows. In each type at least one setter is required per row of the transplanter in addition to a driver for the tractor. The ground speed is limited to the dexterity of the individual setters, which translates to generally 1-2 mph maximum. The transplanting apparatus of the subject invention is superior in these respects in requiring no setters while speeds of 5 mph are often attainable.

The most pertinent prior art known to the Applicants may be found in United States Patent Office classification Class 47, 53, 61 and 111. Exemplary references include U.S. Pat. Nos. 3,172,234 to Eavis; 3,177,616 to Sawyer; 3,305,968 to Dosedla et al.; British Pat. No. 1,030,658 and German Pat. specification No. 1,877,266.

The above enumerated advantages, inter alia, are met, and the disadvantages of the prior art overcome by employing the process and apparatus of the present invention.

SUMMARY OF THE INVENTION

Briefly described, one aspect of the invention comprises a process for treating seeds including: (1) forming a continuous transplant carrier tape having spaced containers or capsules in which is inserted an individual seed and media to support its growth, and (2) germinating and preculturing the seeds within the capsules for at least a period of time to allow radical and cotyledon to emerge from the seeds and develop for a further period of time. In one embodiment of the invention, the continuous transplant carrier tape may comprise a long flexible cover or support backing on which is affixed at spaced intervals in corrugated cardboard-like fashion a plurality of receptacles to form capsules or containers having opening means for emergence of the growing plant, and aperture means to allow the exchange of moisture and gases through the capsules. The continuous transplant carrier is synchronously fed through a planting mechanism which individually severs and plants the containers and the included plants in soil or other nutrient environment in predetermined spaced relationship. The structure of the planting mechanism includes a plurality of fingers which grip and place the individual capsules in the ground. These fingers are affixed and rotatably carried by an endless support, such as a chain, which in turn is trained about a pair of rotatable members, such as sprockets. The fingers are releasably disengaged from the capsules upon implantation of the capsule.

The method and apparatus of the invention is particularly adapted to the automated planting of row crops which may be ordinarily transplanted, such as sugar beets, lettuce, broccoli, cauliflower, tomatoes and cabbage as well as tree seedlings and the like.

BRIEF DESCRIPTION OF THE DRAWINGS

In the drawings, in which like numerals refer to like parts in the several figures.

PREFERRED EMBODIMENTS OF THE INVENTION

The invention will be more fully particularized by reference to the accompanying drawings which depict preferred, but non-limiting embodiments of the invention.

1. Transplant Carrier Tape

Figure 1:
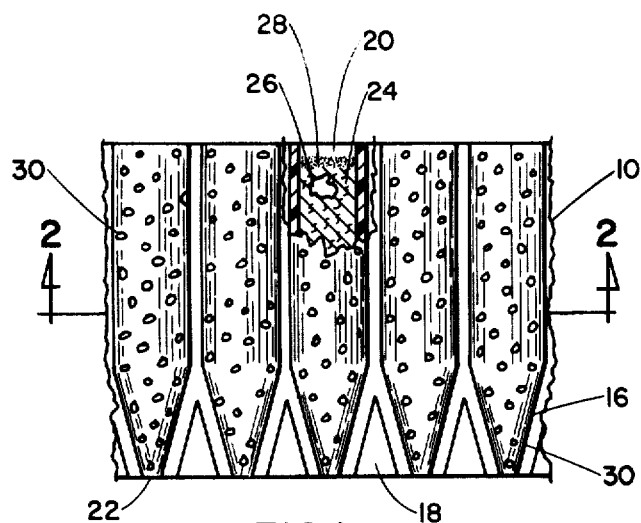
FIG. 1 depicts a partial cutaway view of a portion of a continuous transplant carrier tape prior to preculturing.
Figure 2:
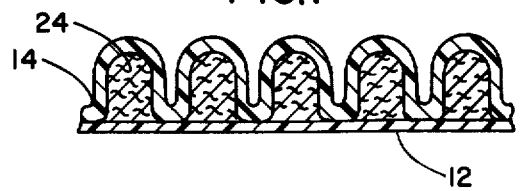
FIG. 2 is a sectional view of FIG. 1 taken along Section 2—2.

A five capsule segment of a continuous transplant carrier tape is shown in FIGS. 1 and 2. The continuous carrier is generally designated at 10 and consists of a flexible backing 12 which functions as a cover onto which is firmly secured a series of spaced receptacles 14, which may be attached, for example, by heat sealing or by use of a suitable adhesive. The receptacles 14 are preferably formed by furrowing or wrinkling a long piece of suitable material and affixing valley portions to the backing. It is also preferred to taper the receptacle 14 at the bottom end 16 to facilitate root emergence and retainment of support media 24 and seed 26. This tapering procedure produces slack pleats 18 along the lower portion of the tape carrier. The upper end 20 and lower end 22 of the capsules are open to allow emergence of stems, leaves and roots, particularly taproots. The contents of the capsule are preferably held in place by the use of retaining means 28, such as a water soluble binder. This binder also serves the important function of maintaining the desired position of the seeds in the capsules during handling and transport. A plurality of perforations 30 provide porosity in either the receptacle 14, backing 12, or both, for exchange of moisture and gases across the container wall and further to facilitate emergence of side roots and hair roots. The final capsule arrangement may take on a corrugated cardboard or machine gun belt like configuration.

A number of types of seeds including tree, vegetable, sugar beet and other types of seeds whose plants are commonly transplanted may be employed. Particularly applicable are high value row crops which may suffer from crowding or a short growing season, such as sugar beets, lettuce, broccoli, cauliflower, tomatoes and cabbage. For uniform emergence, it is preferred to selectively upgrade the seeds. It is preferred that of the seeds utilized, at least 90%, more preferably at least 95%, and most preferably at least about 99% germinate. Commonly employed methods of grading, exemplified by vibration techniques, the density-gravity table, color coding and air classification are useful. It has been found that in general the more dense seeds produce higher germination rates. If desired, a viability detection system may be employed to detect capsules having ungerminated seeds and a method employed to selectively remove the undesired capsule(s) and rejoin the continuous carrier tape. A photocell could be used in such a detection system.

The receptacles 14 and backing 12 may be made of the same or different material. Preferably, the materials are made of a material suitable for rolling on a spool, for instance, and adapted to be handled by a mechanized planter. A variety of plastic materials including natural and synthetic resins such as cellulose acetate, butyrates, styrenes, saran, polyethylenes, etc., may be utilized. The thermoplastics are preferred for both backing and receptacle for economic reasons and since they may easily be joined together by heat sealing and the desired shape maintained by vacuum. Other suitable materials include cloth, absorbent filter paper (which has its own built-in porosity), light cardboard materials and foil. Various types of packaging film may be utilized.

The support media 24 may comprise aqueous medium, nutrient medium such as soil or vermiculite, insecticides, fungicides, herbicides, growth regulators, fertilizers or compatible mixtures thereof. Various other types of support media such as activated charcoal for herbicide protection, if necessary, could also be employed. The type of seeds and environment which the young transplant will be subjected to will dictate the optimum composition of support media. Water soluble binder 28 is provided as a sealant to maintain the support media and seed in the capsule during transport, handling, etc. A plug could be supplied by a water soluble pellet which would fit snugly into the capsule. Preferably, loose support medium is placed over the seed and this medium sprayed lightly with the water soluble binder or adhesive. Examples of suitable binders include starch, sugar solution, polyvinyl alcohol, polyacrylamides and cellulose derivatives such as hydroxyethyl cellulose. Alternatively, the seeds could be heat sealed or glued to the wall of the container 14 or backing 12 to thereby retain the seed in its proper position in the case handling or transport might cause excessive vibration and migration of the seed away from its initial position within the capsule. Also, the backing 12 could be provided with an extended portion adapted to be folded over the opening 20 to retain the contents of the capsule during transport, storage, etc.

2. Tape Manufacture

Figure 3:
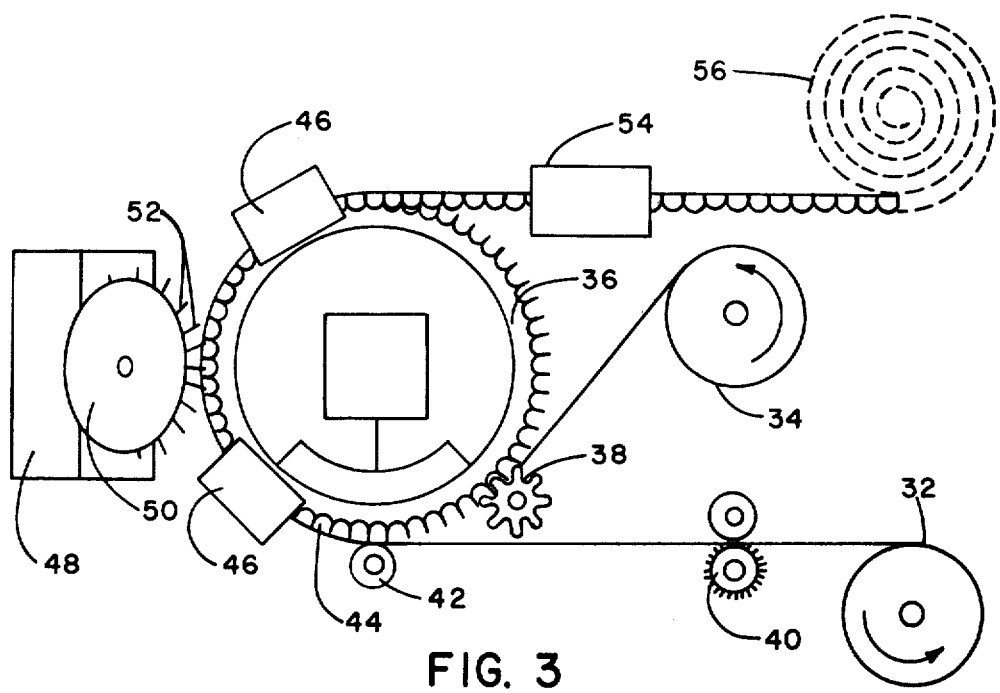
FIG. 3 is a schematic view of apparatus adapted to form the transplant tape.
Figure 4:
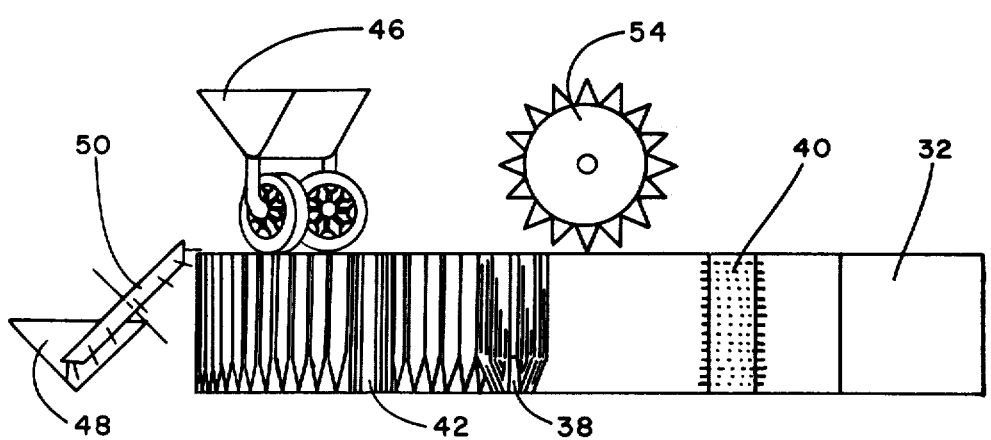
FIG. 4 is a schematic side view of FIG. 3.

An illustrative, non-limiting procedure for manufacturing continuous carrier transplant tape is shown in FIGS. 3 and 4. Accordingly, a first roll of plastic 34 such as one mil thick polyethylene is fed onto a large rotary die 36. The first stage of this rotary die has a matching die shape 38 which forms one half of the capsule as the roll of plastic is fed through the die. The shape and position of the plastic is maintained by a vacuum manifold built into the die. Alternative forming operations such as thermal forming or vacuum forming could be employed. A second sheet of plastic from roll 32 is fed through hot perforator 40 and over heat seal roller 42 to form a backing cover juxtaposed and firmly attached to the sheet of open faced receptacles carried by the rotating die 36.

The capsule envelope 44 formed by the heat sealing operation is next filled with support media metered in from the bin 46 to approximately one-fourth inch depth, for example, from the top of the capsule. The portion of support media released from the metering wheel is ejected with a horizontal velocity matched to coincide with the velocity of the rotating die 36, allowing continuous and high speed production.

At this point in the process, the partially filled capsule receives a seed from the seed selection device comprising a seed hopper 48 and a vacuum wheel pickup 50 having a plurality of fingers 52. The vacuum wheel rotates about an axis which is approximately 45° to the horizontal. The fingers 52 pick up a single seed and are made to release the seed at a position above the partially filled capsule which is traveling by. The vacuum wheel should be rotating at a speed necessary to supply a seed for each capsule. It may be sometimes advantageous to provide two vacuum fingers per capsule cavity to increase the probability that a seed will be present for each capsule. Control devices or detection systems can be utilized (such as use of a photo cell, electrostatic device or air flow) to insure that a seed is provided each capsule. One such method of control would be to use a hypodermic needle with the vacuum pick-up finger and adjust the vacuum level according to the weight and geometry of the particular seeds. In the case where more than one seed is picked up by the vacuum finger, a fluidic, pneumatic, electronic or other circuit can be used to detect the extra seed(s) and cause this finger to be bypassed in favor of a succeeding finger having a single seed.

Preferably, an additional small portion of support media is metered into the capsules to cover the seed. This depth will vary according to the type of seed utilized, although preferably the seed location is in the upper one-third portion of the capsule 14. At this point, it is preferred to spray a small amount of water soluble binder to maintain the growth medium in the capsule from spray nozzle 54. The capsules may also be sprayed from below, depending on whether the support medium has a tendency to spill out the bottom. Generally this will not be necessary because of the tapered design of the capsule. Once the capsules have been sprayed, the tape is preferably wound by machine onto a large roll which may contain, for example, from 4,000 to 25,000 capsules. These rolls of tape 56 may be provided with a pressure sensitive leader on each end so that they may be positioned on a planter, subsequently described, for automated plantings and to prevent unrolling.

3. Germination and Preculture

The next step of the process involves transport of the transplant carrier tape to a suitable germination and preculturing environment such as a large germination environment chamber, or more preferably a green house. The requirements for germination will depend upon the particular type of seed and conditions under which the seed will eventually mature in the field. Optimum conditions of temperature, moisture level, aeration, light and the interaction of these factors should be maintained to optimize germination and overcome any germination blocks. For example, lettuce may require continuous lighting and temperatures less than 76° Fahrenheit, preferably from about 59° to 65° Fahrenheit. For sugar beets, the optimum temperature will be somewhat greater than that for lettuce, generally in the range approximately near 65° to 85° Fahrenheit. Cooler temperatures maintained at night may help to improve field survival after transplanting.

For any particular seed to germinate, a definite amount of water must be absorbed, and this moisture requirement may be provided by irrigation or subirrigation using a sprinkler system, misting or soaking. Preferably, an automatic sprinkler system would be maintained to provide the necessary moisture either continuously or at intervaled time periods.

The length of preculturing will be dependent upon the temperature, moisture level, lighting, particular type of seed, etc., but in general will extend for a period of time at least to allow radical and cotyledon to totally emerge from the seed coats. Preferably, the time period is extended well beyond the time when radical and cotyledon emerge. In general, the preculturing time period will preferably extend for from about 10 days to about 12 weeks. As an example, in the culturing of sugar beets, it is preferred that the preculturing time period last for at least from about 6 to about 12 weeks, more preferably from about 8 to 10 weeks. This extra length of culturing has been found to greatly enhance the ultimate performance of the seedlings in the field and resultant crop production and quality, as well as providing improved resistance to herbicides, insecticides, frost, etc.

Once the continuous transplant carrier tape has been subjected to germination treatment and preculturing, the transplant tapes are ready to be attached to the planter which will sever individual capsules, inserting them into the soil one at a time at whatever spacing is desired. Preferably, upright growth attitude of the seedlings is maintained during planting.

4. Transplanting Mechanism

Figure 5:
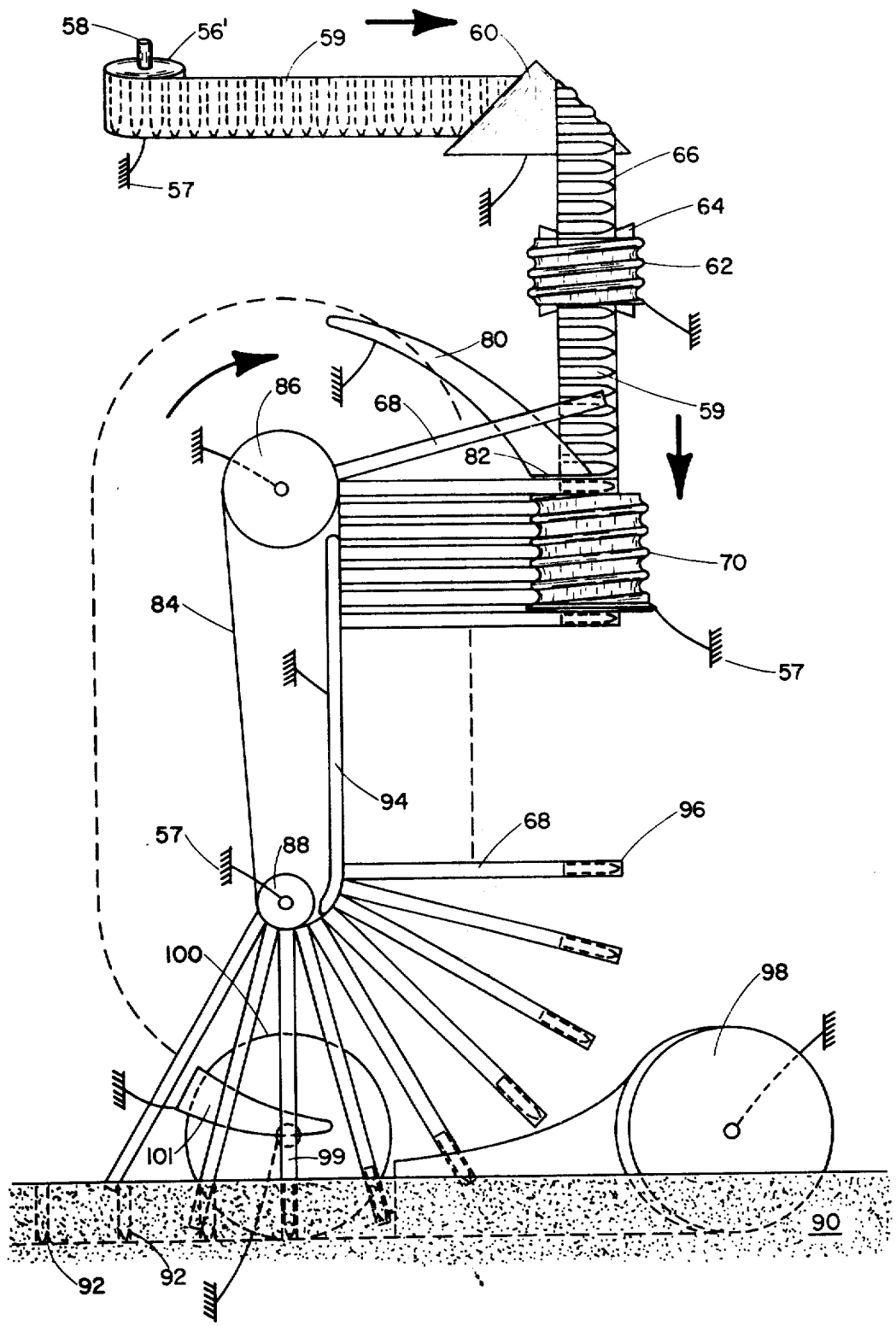
FIG. 5 is a side view of transplanting apparatus of the subject invention.

Referring to FIG. 5 of the drawings, a rolled tape 56' of individual transplant capsules 59 is mounted on a suitable platform (not shown) which in turn is connected to the frame 57 of the "transplanter". The frame may be of conventional construction including wheels and axles and adapted to be rolled along the ground with the aid of a tractor hookup. The tape roll 56' is preferably placed upon a vertical spindle 58 to permit relatively free unrolling. Because the capsules have been under an extended preculturing period and are generally wet, soggy, and relatively limp, the vertical orientation of the roll permits easy delivery to the planting mechanism. The roll of soggy transplants may be advantageously handled by a piece of water-proof cardboard to maintain integrity of the roll.

The tape of transplant capsules are further delivered to the planting mechanism via cone roller 60, or other means such as a tilted cylindrical roller which operates to orient the individual capsules generally horizontally.

After the tape has thus been re-oriented, it enters a synchronizing and feeding device such as synchronizing worm gear 62 positioned on the corrugated side of the tape capsules together with a matching roller 64 positioned on the opposite side of the tape capsules. The synchronizing worm 62 has grooves in its outer periphery to match the shape and spacing of the individual capsules of the transplant tape. The direction of rotation of the worm is such that a leading edge of the worm flight separates the capsules beginning at their rightmost end 66, which, by virtue of its tapered configuration provides a continuing built-in guide to proper separation of capsules.

The speed of worm gear 62 is synchronized with the speed of a plurality releasable grasping means such as rotatably driven planter fingers 68 (only a portion of which are shown) so that such fingers are delivered consecutively for engagement with each of the capsules 59 of the transplant tape.

To precisely synchronize engagement of the ends of the planting fingers 68 with the transplant tape it is preferred to employ an additional guiding and synchronizing means such as worm 70 which is mounted below first worm 62 and preferably maintains a slight tension in the transplant tape extending therebetween. This worm gear 70 also functions to hold the transplant tape in place while the transplant capsules are severed into independent capsules engaged individually by each of the planting fingers 68. One or more knife edges 72, shown more clearly in FIG. 6, may be provided in the worms periphery for the purpose of severing the capsules, although it would be equally effective to mount the knife edges 72' on matching cylindrical roller 74. The tape may be provided with perforations between individual capsules for facilitating severence. Optionally, severence of the capsules could be accomplished by heating means, such as with the use of a hot wire cut-off.

Figure 6:
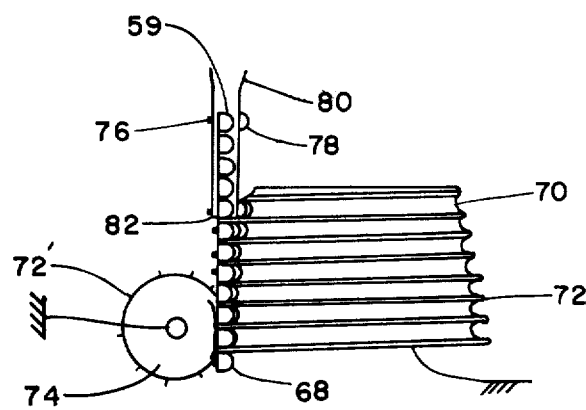
FIG. 6 is an expanded view depicting the operation of the cut-off worm of FIG. 5.
Figure 7:
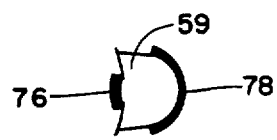
FIGS. 7 and 8 show finger and capsule engagement details.
Figure 8:
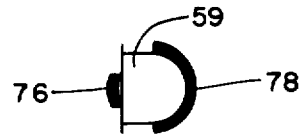

A preferred arrangement for engaging the planter fingers 68 with the individual capsules 59 is obtained by splitting the ends of the planter fingers to form first and second split portions 76 and 78, respectively. Such splitting of the planting fingers 68, which may be constructed of elongated plastic (e.g. polypropylene) tubes, is facilitated by splitting the tube off-center producing, for instance, a split with one-half 76 containing about 30% of the circumference and the remaining half 78 containing 70% of the circumference. The spreading of the split sides is accomplished by a mounted finger spreader 80 so designed to spread the fingers 76 and 78 progressively apart until the finger halves straddle the capsule 59. As the fingers 68 further rotate the halves 76 and 78 are resiliently released from the end 82 of the finger spreader to match the teeth of synchronizing worm 70 and become resiliently engaged with the individual capsules 59 (also shown in FIG. 8). As the tape then continues vertically downward the fingers squeeze the capsules as shown in FIGS. 6 and 7 preparatory to being severed by the cut-off knife 72 or 72'. While the capsules are shown completely contained within the ends 96 of the planter fingers, the capsules could protrude longitudinally beyond somewhat, if desired.

The releasable grasping means or fingers 68 are supported at one end thereof on an endless support means 84 such as a roller or conveyor chain which in turn is circumferentially driven about spaced first and second frame mounted rotatable members 86 and 88, such as sprockets. The endless support means 84 could also be an endless conveyor belt or cog belt, for instance, in which case the rotatable members would be matching cog wheels or sheaves. At least one of the rotatable members 86 or 88 is driven and if desired may be driven at a speed synchronized with the ground speed at which the transplant apparatus is to be operated.

Any suitable means for attaching the planting fingers 68 to the endless support 84 may be employed, such as by the use of attachment links supported by the belt or chain coupled with rivet or bolt linkages securing the planting fingers 68 to the attachment lengths. Other conventional attachment means can be employed without departing from the scope of the invention.

While the diameter of the upper rotatable member 86 may vary considerably as desired, the lower rotatable member 88 must be of a predetermined size in order to achieve a proper spacing in the soil 90 between spaced implanted capsules 92. For example, if the lower sprocket 88 has a diameter of 2 inches and the fingers 68 are about 18 inches long, a spacing in the soil of about 12 inches is thereby produced. In a preferred embodiment a lead-in curve 94 is employed for the purpose of gradually accelerating the tip 96 of the planting fingers to the desired angular velocity for protection of the transplants.

Preferably a disc, shoe plow or other means 98 is employed to open a furrow in the soil to receive the capsules and included transplants. As a finger 68 and included capsule is approximately vertically oriented as at 99, a second releasing means or finger spreader 101 spreads apart the halves of the planter fingers while approximately simultaneously a conventional press wheel 100 squeezes soil around the now separated capsule to maintain its substantial vertical orientation within the soil. The operation of spreading apart the finger halves and pressing soil about the capsule is closely coordinated so that the orientation of the capsule is maintained substantially vertically and toppling over is prevented.

As the fingers pass over and leave the spreader 101, they resiliently reconform to their unseparated position preparatory to being revolved and once again being spread apart by finger spreader 80 to repeat the continuous cycle.

It will be appreciated that grasping means other than resilient plastic tubes may be utilized for engaging and carrying the individual capsules for planting. For instance, the planting finger could be formed of twisted and formed spring steel wire designed to wedge a capsule and transplant for holding. The same function can also be performed by a finger which pierces the soggy capsule in several places, holding it there until it is placed in the soil. However, the advantage of employing the superimposed planter fingers described herein with reference to the drawings is that the capsule and seedlings are protected by the encirclement of the planter finger. The overall mechanism should be so designed as to preclude crushing, mangling or accelerations sufficiently high to whip off the tops of the transplants.

It will also be appreciated that the synchronizing and delivering means described including worm gears 62 and 70 could be replaced by other means. Additionally, a single worm gear rather than two would suffice for most purposes.

The just described transplanter has the advantage of requiring no labor or hand care on the machine once the roll to tape is in place. Obviously, a plurality of spindles 58 could be employed for standby rolls in the field. Also, if it is desired to plant a number of rows simultaneously, units are cascaded for this purpose. The automatic nature of this apparatus will permit transplanting speeds as high as 5 miles per hour or more, depending on conditions.

5. Field Examples

As an illustrative example of the advantages of the present invention, a 6 × 6 Latin Square was laid out on a farm in East Grand Forks, Minnesota, and hand planted with hybrid sugar beet seeds and transplants grown and precultured according to the present invention. Each plot measured 35 feet in length and 44 inches in width. Various sizes of the sugar beet seeds as well as coated and uncoated seeds were planted in a number of the plots. A number of transplant capsules according to the present invention which had been precultured in a germinating environment for about 8 to 9 weeks were also planted in certain of the plots of the Latin Square. The tape capsule construction was essentially identical to that shown in FIG. 1, where the backing and compartment capsules were made of one mil polyethylene heat sealed together. The support medium used in the capsules consisted of vermiculite, peat moss, basic nutrients and trace elements. The resulting yield showed that the transplant sugar beets according to the present invention produced a gross sugar increase of 16.6 weight percent greater than the yields produced from the directly seeded control sample.

Subsequently performed tests of an essentially identical nature to that described above produced even better results, with gross sugar yields about 25 weight percent greater than the seeded controls.

A test similar to the above was carried out on the same farm using four replicated plots and control plots of sugar beets. The preculturing time period was 11 days. The transplanted sugar beets yielded a 7 percent gross increase in sugar content over the control samples.

6. Modifications of the Invention

It should be understood that the invention is capable of a variety of variations and modifications which will be made apparent to those skilled in the art by a reading of the present specification.

What is claimed is:

1. A process for the automated transplanting of a continuous transplant carrier into individual capsules containing transplants, comprising the steps of:

forming a continuous transplant carrier tape provided with spaced capsules each of sufficient size to accommodate the germinated seed or plant and media to support growth and provided with aperture means for the exchange of moisture and gases to support such growth;

said tape formed by providing a continuous length of flexible backing, corrugating a continuous length of plastic sheet to form corrugations including alternate valley portions, attaching said valley portions to the flexible backing to thereby define said spaced capsules, and perforating said capsules to provide for the exchange of moisture and gases;

inserting seed and support media within the capsules;

winding said tape into a roll provided with means for preventing unrolling of the roll;

germinating and preculturing the seeds in said capsules for a period of time well beyond the time when radical and cotyledon emerge from the seeds to produce such transplants;

mounting said roll of carrier tape with transplants contained in said individual capsules onto a transplanting mechanism so that the capsules are oriented substantially vertically;

unrolling said roll and reorienting the capsules into a substantially horizontal attitude;

grasping said capsules individually and severing individual capsules one from another and thereafter synchronously reorienting the thus severed capsules into a vertical position with the transplants upright; and thereafter planting the capsules together with included upright transplants in spaced relationship.

2. The process of claim 1 wherein the seed is one characterized by later producing a row crop normally suffering from crowding or a short growing season.

3. The process of claim 1 wherein the seed is of the sugar beet variety.

4. The process of claim 3 wherein the preculturing period for the sugar beet transplants is from about 6 to about 12 weeks.

5. The process of claim 3 wherein the preculturing period for the sugar beet transplants is from 8 to about 10 weeks.

6. The process of claim 1 wherein the period of preculturing is from about 10 days to about 12 weeks with temperature, moisture level and lighting controlled during that period.

7. The process of claim 1 wherein water-soluble binder is supplied to the top portion of the capsules to seal the seed and support media in relatively fixed location.

* * * * *